United States Patent
Konishi et al.

[11] Patent Number: 5,948,306
[45] Date of Patent: Sep. 7, 1999

[54] CERAMIC HEATER

[75] Inventors: Masahiro Konishi; Kazuho Tatematsu, both of Aichi, Japan

[73] Assignee: NGK Spark Plug Co., Ltd., Aichi, Japan

[21] Appl. No.: 08/826,144

[22] Filed: Mar. 27, 1997

[30] Foreign Application Priority Data

Mar. 29, 1996 [JP] Japan .................................. 8-103861

[51] Int. Cl.$^6$ ...................................................... H05B 3/10
[52] U.S. Cl. ........................... 219/548; 219/270; 219/544
[58] Field of Search .................... 219/260, 538, 219/546, 548, 552, 553, 270, 544

[56] References Cited

U.S. PATENT DOCUMENTS

| | | | |
|---|---|---|---|
| 4,814,581 | 3/1989 | Nunogaki et al. | 219/270 |
| 4,874,923 | 10/1989 | Hatanaka et al. | 219/270 |
| 4,912,305 | 3/1990 | Tatemasu et al. | 219/544 |
| 5,206,484 | 4/1993 | Issartel | 219/270 |
| 5,304,778 | 4/1994 | Dasgupta et al. | 219/270 |
| 5,362,944 | 11/1994 | Hatanaka et al. | |

FOREIGN PATENT DOCUMENTS

| | | |
|---|---|---|
| 0 107 511 | 5/1984 | European Pat. Off. |
| 37 34 274 | 4/1988 | Germany . |
| 44 40 005 | 5/1995 | Germany . |
| 64-61356 | 3/1964 | Japan . |
| 60-28193 | 2/1985 | Japan . |
| 60-60983 | 4/1985 | Japan . |
| 60-216484 | 10/1985 | Japan . |
| 60-254586 | 12/1985 | Japan . |
| 63-96883 | 4/1988 | Japan . |

*Primary Examiner*—Tu Ba Hoang
*Attorney, Agent, or Firm*—Finnegan, Henderson, Farabow, Garrett & Dunner, L.L.P.

[57] ABSTRACT

A ceramic heater is formed by embedding a heating element in a ceramic body. A ceramic body is formed from a sintered basic ceramic component containing an adjustment ceramic component in the range of 1 to 3% by weight. The adjustment ceramic component includes at least one component selected from the group consisting of metal silicate, metal carbonate, metal boride, and metal nitride each of which is larger in thermal expansion coefficient than the basic ceramic component.

11 Claims, 7 Drawing Sheets

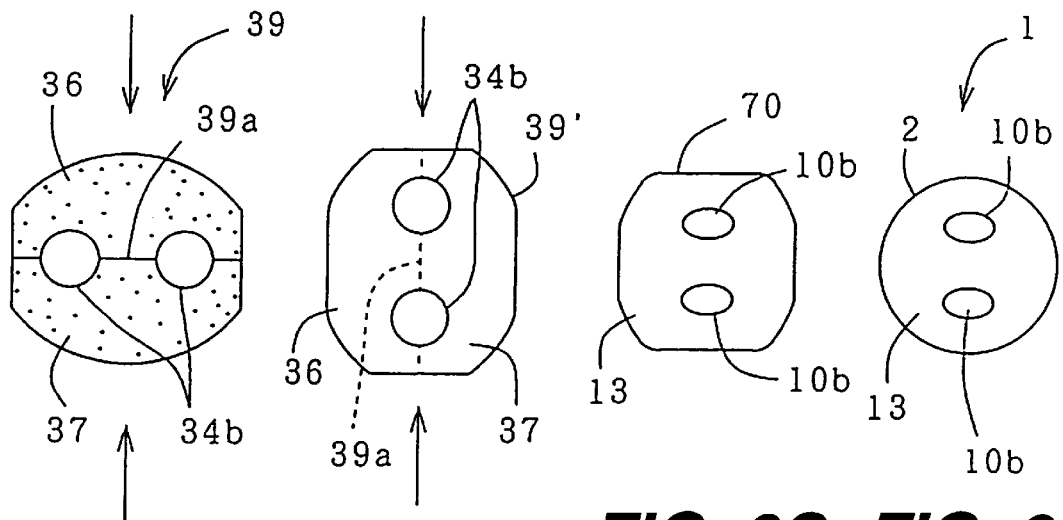
FIG. 6A  FIG. 6B  FIG. 6C  FIG. 6D
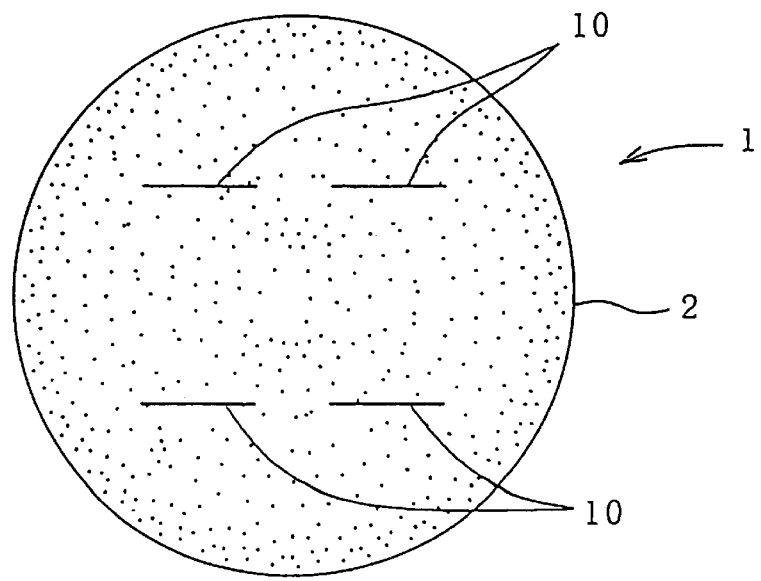
FIG. 7

CERAMIC HEATER

BACKGROUND OF THE INVENTION

1. Field of the Invention

The present invention relates to a ceramic heater and, for example, to a ceramic heater-used in a ceramic glow plug or the like.

2. Description of the Related Art

Conventionally, as a ceramic heater used in a ceramic glow plug or the like, there is known a ceramic heater having a structure in which a heating element for performing resistive heating by current conduction is embedded in an electrically insulating ceramic body containing $Si_3N_4$ or AlN as a main component. For example, the heating element is formed from electrically conductive ceramics constituted by silicates, carbonates, borides or nitrides of W, Mo, etc. or from a high-melting-point metal wire of W, W—Re, Mo, etc.

In such a ceramic heater, because the thermal expansion coefficient of $Si_3N_4$ or AlN constituting the ceramic body is smaller than that of the conductive ceramic or metal wire constituting a ceramic heating element, stress based on the difference between the thermal expansion coefficients may be concentrated in the ceramic heating element to bring about a problem in the durability of the heater when a cycle of heating and cooling is repeated. Therefore, there has been made an attempt to add a ceramic component such as metal silicate, metal carbonate, metal nitride or metal boride or the like (hereinafter referred to as "adjustment ceramic component") larger in thermal expansion coefficient than $Si_3N_4$ or AlN into the ceramic body to reduce the aforementioned thermal expansion coefficient difference to thereby improve the durability.

The aforementioned ceramic heater has a disadvantage in that the following problems arise when the amount of the adjustment ceramic component added to the ceramic body becomes excessive.

(1) Among metal silicate, metal carbonate, metal nitride and metal boride as adjustment ceramic components, there are some components which react with oxygen in the atmosphere so as to be changed into oxides when a cycle of heating and cooling is repeated in a temperature range of from about 400° C. to about 900° C. For example, $MoSi_2$ is easily changed into oxide when heated to a temperature in a range of from about 400° C. to about 500° C. in the atmosphere. Because of a property in which such oxides are sublimated or evaporated at a considerably lower temperature (for example, in a range of from 700° C. to 800° C.) than the temperature of use of the ceramic heater, pores (vacant holes) may be formed with the sublimation or evaporation of the oxides while the ceramic heater performs heating. There arises a problem that when the content of the adjustment ceramic component becomes excessive, the quantity of the aforementioned pores increases, so that the durability of the heater is lowered.

(2) It is necessary that rare-earth or alkali-earth metal oxide or the like as a sintering assistant agent is added to the ceramic body containing $Si_3N_4$ or AlN as a main component in order to accelerate sintering. The sintering property of ceramics containing $Si_3N_4$ or AlN as a main component lowers as the amount of the adjustment ceramic component to be added increases. As a result, it become necessary to increase the amount of the sintering assistant agent to be added to compensate for the lowering of the sintering property. However, the heat-resisting property of the ceramic body is lowered as the amount of the sintering assistant agent to be added increases, so that there may be an obstacle to security of durability of the ceramic heater in accordance with the use condition. If the amount of the sintering assistant agent is not increased, the density of the sintered body is insufficient to thereby bring shortage of mechanical strength of the ceramic heater. Furthermore, the amount of the sintering assistant agent to be added has to be adjusted delicately in accordance with the added amount of the adjustment ceramic.

With respect to the conventional ceramic heater, the range of addition of the adjustment ceramic component for avoiding the aforementioned harmful effects has not been sufficiently discussed. Accordingly, there occurred such a problem that the amount of addition of the adjustment ceramic component after became excessive so that the durability of the ceramic heater could not be improved or was lowered, etc.

SUMMARY OF THE INVENTION

It is an object of the present invention to provide a ceramic heater in which the amount of an additive component for adjusting the thermal expansion coefficient of a ceramic body is set to be an optimum value to obtain excellent durability.

A ceramic heater is formed by embedding a heating element in a ceramic body. A ceramic body is formed from a sintered basic ceramic component containing an adjustment ceramic component in the range of 1 to 3% by weight. The adjustment ceramic component includes at least one component selected from the group consisting of metal silicate, metal carbonate, metal boride, and metal nitride each of which is larger in thermal expansion coefficient than the basic ceramic component.

According to the present invention, the ceramic heater in which the amount of an additive component for adjusting the thermal expansion coefficient of a ceramic body is set to be an optimum value and has excellent durability. Accordingly, since the density of the sintered body is sufficiently strong, it is possible to obtain the ceramic heater having strong mechanical strength without delicately adjusting the amount of the sintering assistant agent.

BRIEF DESCRIPTION OF THE DRAWINGS

In the accompanying drawings:

FIGS. 6A to 6D are typical views showing the change in sectional shape of a composite molding and a sintered body in a method of producing the ceramic heater according to the present invention;

FIG. 7 is a sectional view showing a further embodiment of the ceramic heater according to the present invention.

DETAILED DESCRIPTION OF THE INVENTION

Figure 1:
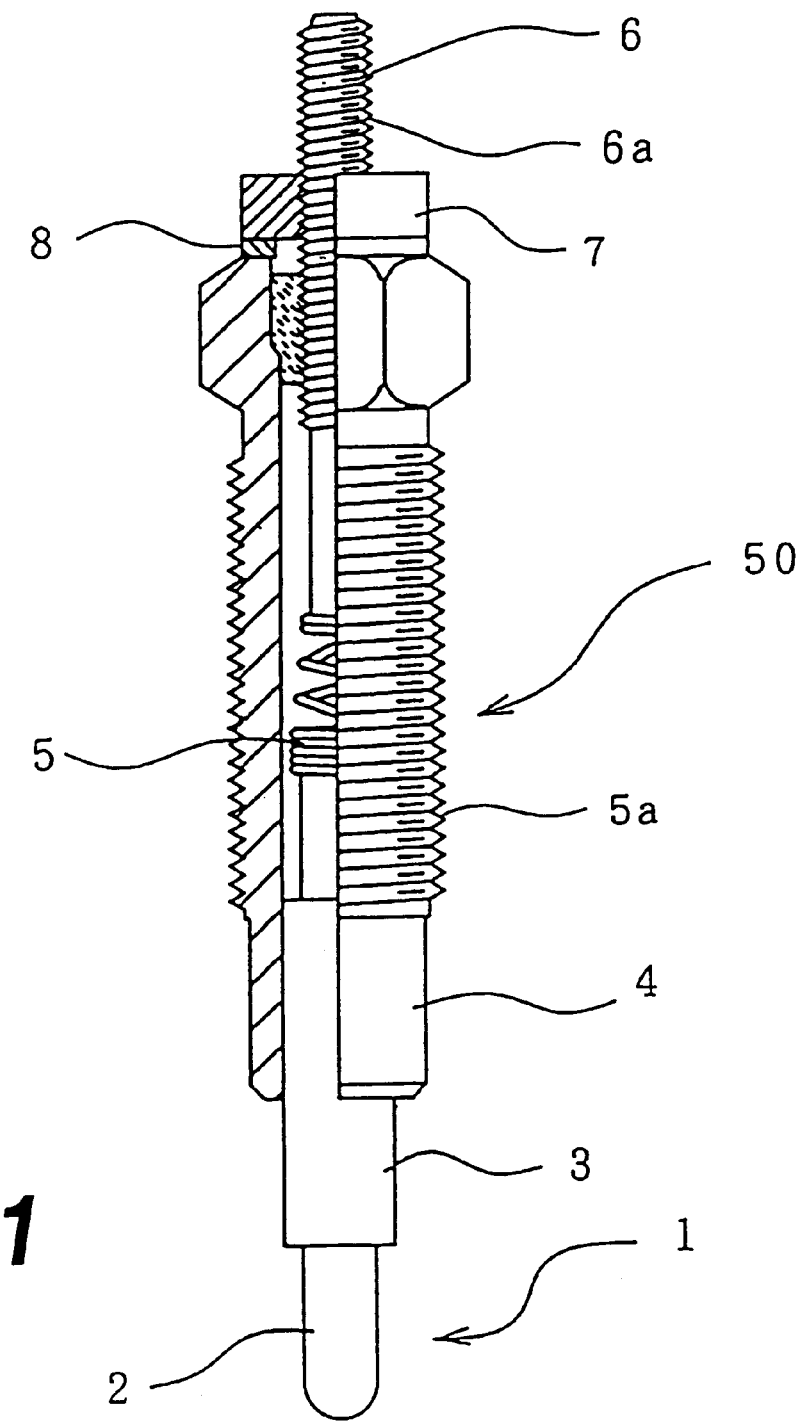
FIG. 1 is a front partial sectional view showing one example of a glow plug using a ceramic heater according to the present invention.

Detailed description of the present invention will be described as following referring to the accompanying drawings.

In the ceramic heater according to the present invention, a heating element is embedded in a ceramic body, and the ceramic heater has the following characteristic in order to solve the conventional problems. That is, the ceramic body is formed by adding, as an adjustment ceramic component, into a basic ceramic component, at least one of the group consisting of metal silicate, metal carbonate, metal boride and metal nitride each of which is larger in thermal expansion coefficient than the basic ceramic component by an amount in a range of from 1 to 3% by weight in total, and sintering the ceramic component added with the at least one member. Incidentally, the metal silicate, the metal carbonate, the metal boride and the metal nitride are preferably selected from the group consisting of silicates, carbonates, borides and nitrides of W, Ta, Nb, Ti, Mo, Zr, Hf, V, and Cr in view of the chemical stability and the coefficient of thermal expansion. Further, the basic ceramic component of the ceramic body preferably contains either $Si_3N_4$ or AlN as a main component in view of heat/shock resistivity and the bend-resistant strength.

In the ceramic heater configured as described above, the adjustment ceramic component is added by an amount in a range of from 1 to 3% by weight to the ceramic body to thereby obtain a sufficient effect for reducing the thermal expansion coefficient difference between the ceramic body and the resistive heating element to thereby avoid concentrate of stress. Furthermore, the amount of oxide originated from the adjustment ceramic component is reduced. Accordingly, there is no fear that the durability of the heater is lowered accompanying with pores as formed described above. Reasons why the amount of oxide generated is reduced are considered that the reduction is caused not only by the small absolute quantity of the adjustment ceramic component but also by the avoidance or suppression of contact between the adjustment ceramic component and oxygen because particles of the adjustment ceramic component are covered with a particle boundary phase formed by sintering (for example, a phase formed by mutual diffusion among powder particles, a phase due to solidification of a liquid phase generated in neighborhood of a particle boundary at the time of sintering, or the like). On the other hand, when the adjustment ceramic component is in a range of from 1 to 3% by weight, the sintering property of the ceramic body is not so much spoiled. Accordingly, it is unnecessary to increase the amount of the sintering assistant agent to be added and it is also unnecessary to delicately adjust the amount of the sintering assistant agent to be added.

If the amount of the adjustment ceramic component to be added is smaller than 1% by weight, the difference in thermal expansion coefficient between the ceramic body and the resistive heating element becomes large, so that there may arise a problem as to the durability of the heater because concentration of stress based on the thermal expansion coefficient difference occurs in the heating element. If the amount is larger than 3% by weight, on the contrary, the amount of generation of oxide originated from the adjustment ceramic component increases, so that there may arise a problem as to the durability of the heater because a large number of the aforementioned pores are formed by sublimation or evaporation of the oxide. Further, because the sintering property of the ceramic body is lowered, the amount of the sintering assistant agent to be added has to be increased so that the heat-resisting property of the ceramic body is significantly lowered correspondingly. If the amount of the sintering assistant agent to be added is not adjusted delicately, there arises a problem that a good sintering condition of the ceramic body can not be obtained. Therefore, preferably, the additive amount of the adjustment ceramic component is selected to be in a range of from 1 to 3% by weight, more preferably, in a range of from 2 to 3% by weight in the present invention.

Next, the heating element may be formed from a ceramic electrically conductive material. Consequently, the life of the heating element can be prolonged. Specifically, the ceramic electrically conductive material may have a structure in which an electrically conductive ceramic phase is dispersed in a matrix ceramic phase. Accordingly, the specific resistance of the heating element can be adjusted easily by changing the content of the electrically conductive ceramic phase. Here, materials to be used as the electrically conductive material are selected by taking account of the coefficient of thermal expansion ($\times 10^{-6}/°$ C.), the specific resistivity ($\mu\Omega$ cm), the coefficient of temperature resistance ((resistance at 1000° C.)/(resistance at room temperature)), and the melting point (° C.). It is preferable that the coefficient of thermal expansion of the electrically conductive material is within that of the ceramic body plus 10 ($\times 10^{-6}/°$ C.) in account of the difference of their coefficient of thermal expansions, the ceramic body being selected by considering the degree of sintering, the heat/shock resistivity, the bend-resistant strength, and the like. The specific resistivity is preferably less than $10^3$ in account of the temperature increment characteristic. The coefficient of temperature resistance is within 1 to 20 in account of the self-control function. The melting point is not less than 1500° C. in account of the maximum temperature in practical use. Accordingly, the electrically conductive ceramic phase is mainly composed of at least compound selected from the group consisting of silicide of W, Ta, Nb, Ti, Mo, Zr, Hf, V and Cr; carbide of W, Ta, Nb, Ti, Mo, Zr, Hf, V and Cr; boride of W, Ta, Nb, Ti, Mo, Zr, Hf, V and Cr; and nitride of W, Ta, Nb, Ti, Mo, Zr, Hf, V and Cr. Table 1 shows examples of the compounds.

TABLE 1

| | MATERIAL CHARACTERISTIC VALUES (LITERATURE VALUES) | | | |
|---|---|---|---|---|
| | COEFFICIENT OF THERMAL EXPANSION ($\times 10^{-6}/°$ C.) | SPECIFIC RESISTIVITY ($\mu\Omega$ cm) | COEFFICIENT OF TEMPERATURE RESISTANCE (R(1000° c.)/R(25° c.) | MELTING POINT (° C.) |
| WC | 4.9 | 19.2 | 1.495 | 2800 |

TABLE 1-continued

MATERIAL CHARACTERISTIC VALUES (LITERATURE VALUES)

|  | COEFFICIENT OF THERMAL EXPANSION ($\times 10^{-6}$/° C.) | SPECIFIC RESISTIVITY ($\mu\Omega$ cm) | COEFFICIENT OF TEMPERATURE RESISTANCE (R(1000° c.)/R(25° c.) | MELTING POINT (° C.) |
| --- | --- | --- | --- | --- |
| TaN | 3.6 | 128 | 1.03 | 3360 |
| TaC | 6.29 | 42.1 | 2.07 | 3877 |
| TiN | 9.35 | 25.0 | 3.48 | 2900 |
| $MoSi_2$ | 8.3 | 21.6 | 7.48 | 2030 |
| $Mo_5Si_3$ | 4.3 | 45.9 | 1.66 | 2100 |
| $WSi_2$ | 8.21 | 12.5 | 3.91 | 2150 |
| $ZrB_2$ | 4.5 | 16.6 | — | 3040 |
| $LaCrO_3$ | 9.7 | $10^6$ | — | 2490 |
| NbN | 10.8 | 78.0 | 10.1 | 2050 |
| $Mo_2C$ | 6.15 | 71.0 | — | 2500 |
| $Si_3N_4$ | 3.2 | — | — | — |

(Source: Kou-Yuuten Kagoubutsu Bussei Binran (High-Melting point Compound Physical Property Handbook, published by Nisso Tsuushin Sha))

Particularly, since the difference in the coefficient of thermal expansion between WC or $Mo_5Si_3$ and the ceramic body is comparatively small, the resistive heating element made of WC or $Mo_5Si_3$ has a good durability. Further, it has extremely high melting point which is higher than 2000° C. Although the coefficient of resistant temperature of $MoSi_2$ is slightly large, the ordinary temperature resistant value is made small by adjusting the amount of the material. Accordingly, since the supply current in a range near the ordinary temperature is made large, the temperature increment characteristic can be improved. Accordingly, WC, $Mo_5Si_3$ and $MoSi_2$ are preferably used as the material of the resistive heating element. If the content is smaller than 30% by weight, the specific resistance of the heating element is too large to obtain sufficient heating. If the content is larger than 80% by weight, on the contrary, good heating element can not be obtained because of insufficient sintering. Accordingly, the amount of the electrically conductive phase with respect to the heating element is adjusted to be in the range of 30 to 80%, preferably, 50 to 70% by weight. Further, the heating element may be formed from a high-melting-point metal wire such as W, W-Re, Mo, etc.

Incidentally, the basic ceramic component may contain a predetermined sintering assistant agent component, inevitable impurities or the like. The sintering assistant agent component may be formed of rare-earth oxide or alkali-earth metal oxide such as $Y_2O_3$, $Er_2O_3$, $Yb_2O_3$, CaO, MgO, etc., and may be added preferably in a range of from 3 to 15% by weight relative to the basic ceramic component. If the amount of addition is smaller than 3% by weight, sintering of the ceramic body becomes insufficient. If the amount is larger than 15% by weight, on the other contrary, the heat-resisting property of the ceramic body becomes insufficient.

Preferred embodiments according to the present invention will be described below with reference to embodiments shown in the drawings.

FIG. 1 shows a glow plug using a ceramic heater according to the present invention and the internal structure thereof. That is, the glow plug 50 has a ceramic heater 1 provided in its one end side, an outer cylinder 3 of a metal for covering the outer circumferential surface of the ceramic heater 1 so as to project a front end portion 2 of the ceramic heater 1, a cylindrical metal housing 4 for further covering the outer cylinder 3 from the outside and so on. The ceramic heater 1 and the outer cylinder 3 are connected by brazing and the outer cylinder 3 and the metal housing 4 are also connected by brazing.

One end of a connection member 5 having opposite ends each of which is formed from metal wire so as to be shaped like a coiled spring is fitted to a rear end portion of the ceramic heater 1 from the outside, whereas the other end of the connection member 5 is fitted to a corresponding one end portion of a metal shaft 6 inserted in the metal housing 4. The other end portion of the metal shaft 6 is extended to the outside of the metal housing 4, and a nut 7 is thread-engaged with a screw portion 6a formed on the outer circumferential surface of the metal shaft 6, so that the metal shaft 6 is fixed relative to the metal housing 4 by tightening the nut 7 toward the metal housing 4. Further, an electrically insulating bush 8 is fitted between the nut 7 and the metal housing 4. Moreover, a screw portion 5a for fixing the glow plug 50 to an engine block (not shown) is formed in the outer circumferential surface of the metal housing 4.

Figure 2:
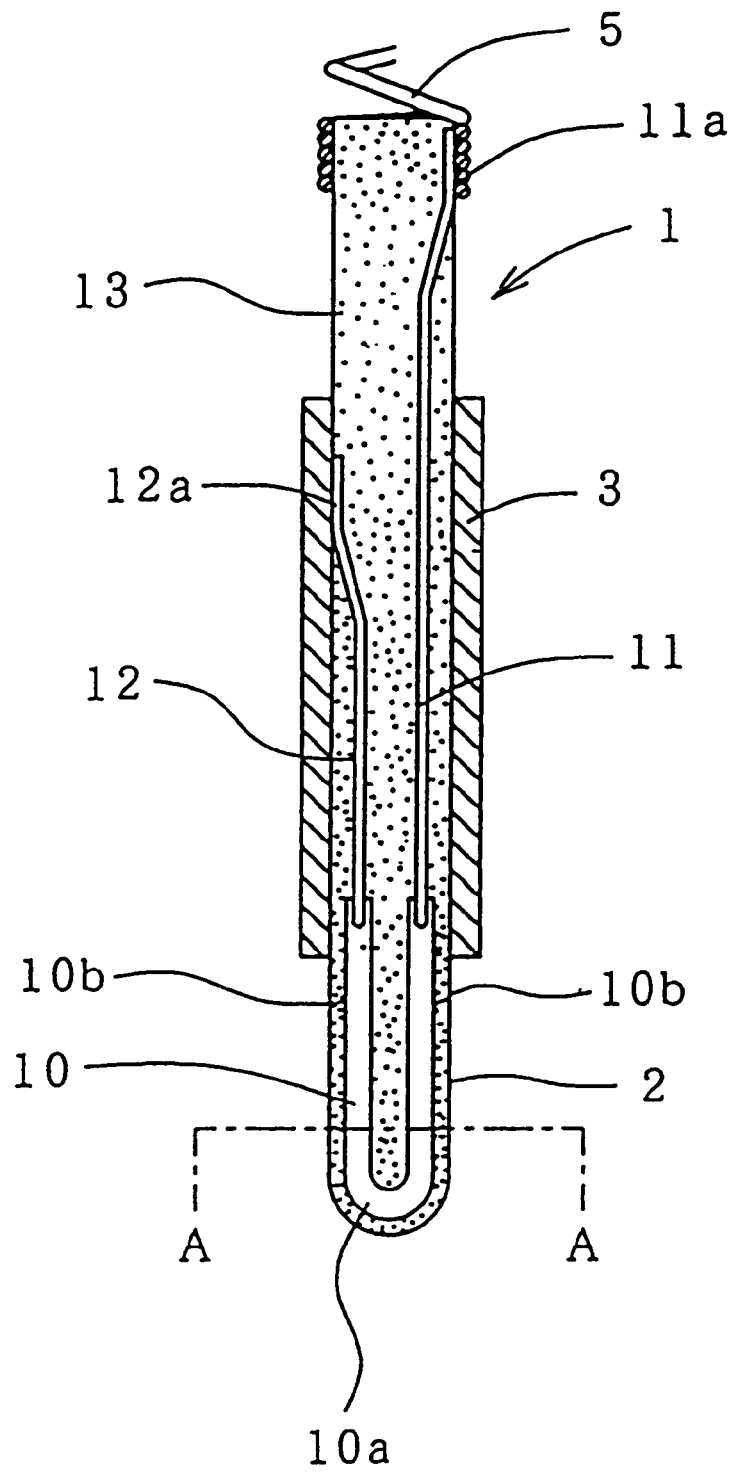
FIG. 2 is a front sectional view of the ceramic heater.

As shown in FIG. 2, the ceramic heater 1 has a U-shaped heating element 10 composed of a change-direction portion 10a which extends from its one base end portion and changes its direction at its front end portion into a different direction toward its other base end portion, and two linear portions 10b which extend in the same direction from the respective base end portions of the change-direction portion 10a. One end of a linear or rod-like electrode portion 11 and one end of a linear or rod-like electrode portion 12 are connected to the end portion of the two linear portions 11 respectively, and the whole of the heating element 10 and the electrode portions 11, is embedded in a rod-like ceramic body 13 having a circular section. The heating element 10 is arranged so that the change-direction portion 10a is positioned in the end side of the ceramic body 13.

The ceramic body 13 is obtained through a process in which at least one member (for example, $MoSi_2$) selected from silicates, carbonates, borides and nitrides of W, Ta, Nb, Ti, Mo, Zr, Hf, V and Cr is added, as an adjustment ceramic component, by amount, in total, in a range of from 1 to 3% by weight, preferably, from 2 to 3% by weight, into a basic ceramic component containing $Si_3N_4$ as a main component, and then the thus obtained ceramic components are sintered. Further, an sintering assistant agent component of rare-earth oxide or alkali-earth metal oxide such as $Y_2O_3$, $Er_2O_3$, $Yb_2O_3$, CaO, MgO or the like, is added by an amount in a range of from 3 to 15%, preferably, 6 to 12% by weight to the basic ceramic component.

Further, the heating element 10 is formed through a process in which the same sintering assistant agent component as used in the ceramic body 13 is added/mixed by an amount in a range of from 0.8 to 10.5% by weight into electrically conductive ceramics, for example, powder containing either WC, $Mo_5Si_3$ and/or $MoSi_2$ as a main component and powder containing $Si_3N_4$ as a main component, and then the mixture is sintered. In the sinter composition is, WC type particles are dispersed in an $Si_3N_4$ type matrix ceramic phase. Incidentally, when the powder mainly containing $MoSi_2$ is used, a part of $MoSi_2$ may be changed to $Mo_5Si_3$ by influence of the sintering assistant agent. In this case, it is considerable that a part of Si component of $Mo_5Si_3$ couples with oxygen contained in the sintering assist agent to be deposit as $SiO_2$. Accordingly, in the case of adding $MoSi_2$, $MoSi_2$ and $Mo_5Si_3$ are apt to exist together. Incidentally, each of the electrode portions 11 and 12 is formed from a metal wire of W, W—Re, Mo, Pt, niobium, nichrome, tantalum, etc.

In FIG. 2, a thin layer (not shown) of a metal such as nickel or the like, is formed on a surface of the ceramic body 13 and in a region including an exposure portion 12*a* of the electrode 12 by a predetermined method, for example, plating, gas-phase film-forming or the like. Through the metal thin layer, the ceramic body 13 and the outer cylinder 3 are jointed to each other by brazing and, the electrode portion 12 is electrically connected to the outer cylinder 3 through the joint portions. Further, a metal thin film is formed in a region including an exposure portion 11*a* of the electrode portion 11, and the connection member 5 is brazed to the thin film. In the aforementioned configuration, a current is made flow in the heating element 10 from an electric source (not shown) through the metal shaft 6 (FIG. 1), the connection member 5 and the electrode portion 11 and grounded through the electrode portion 12, the outer cylinder 3, the metal housing 4 (FIG. 1) and the engine block (not shown).

Figure 3A:
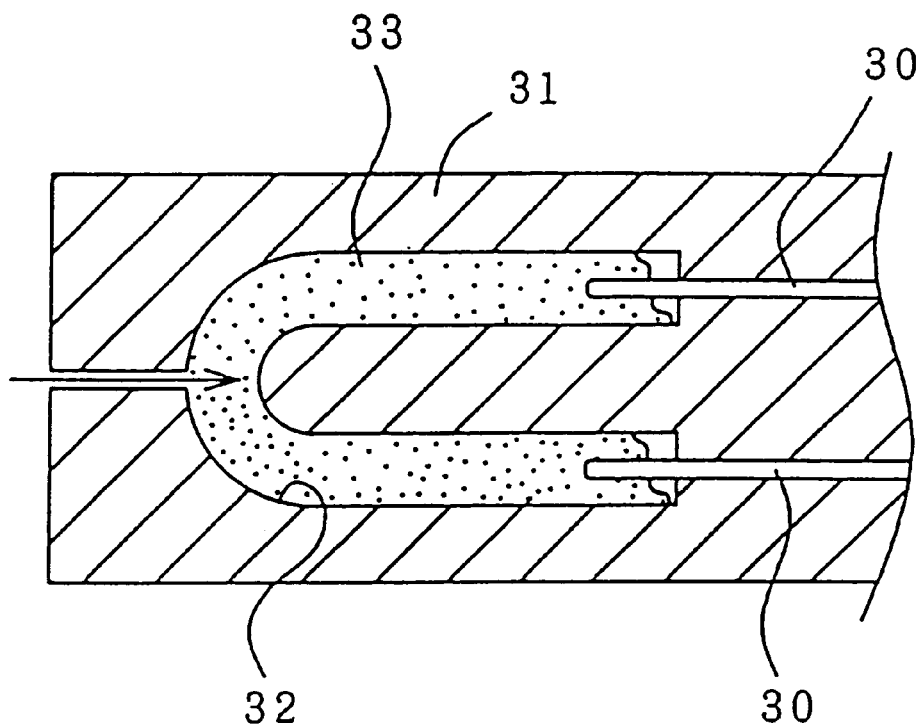
FIGS. 3A and 3B are views for explaining a process of producing the ceramic heater.
Figure 3B:
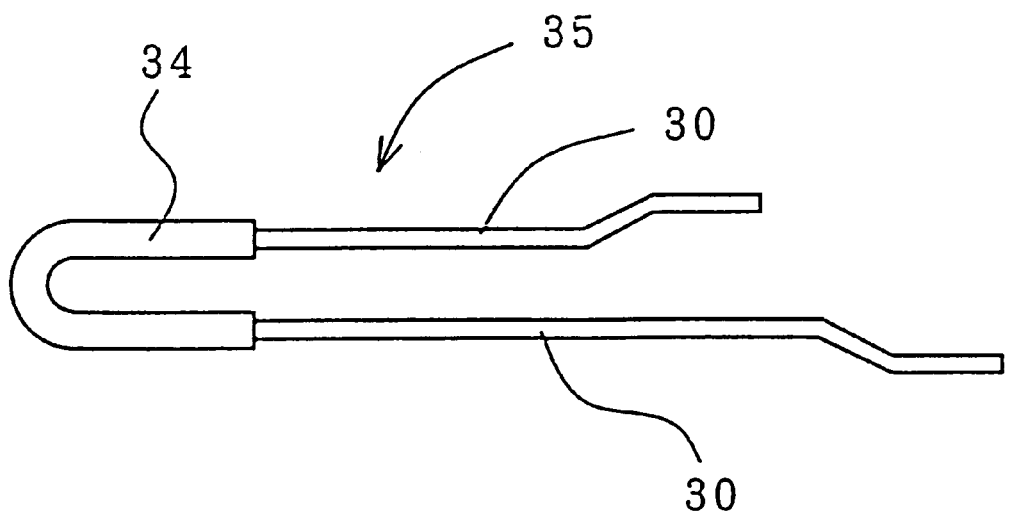

A method of producing the ceramic heater 1 will be described below. First, as shown in FIG. 3A, electrode materials 30 are arranged in a mold 31 having a U-shaped cavity 32 corresponding to the heating element 10 so that one end portions of the respective electrode materials 30 are inserted into the end portions of the cavity 32. In this state, a compound 33 containing electrically conductive ceramic powder, powder containing $Si_3N_4$ as a main component, sintering assistant agent powder and a binder is injected to form an integral molding 35 in which the electrode materials 30 are integrated with an electrically conductive ceramic power molding portion 34 as shown in FIG. 3B. Incidentally, the electrically conductive ceramic powder molding portion 34 is formed so as to have a substantially circular section.

Figure 4A:
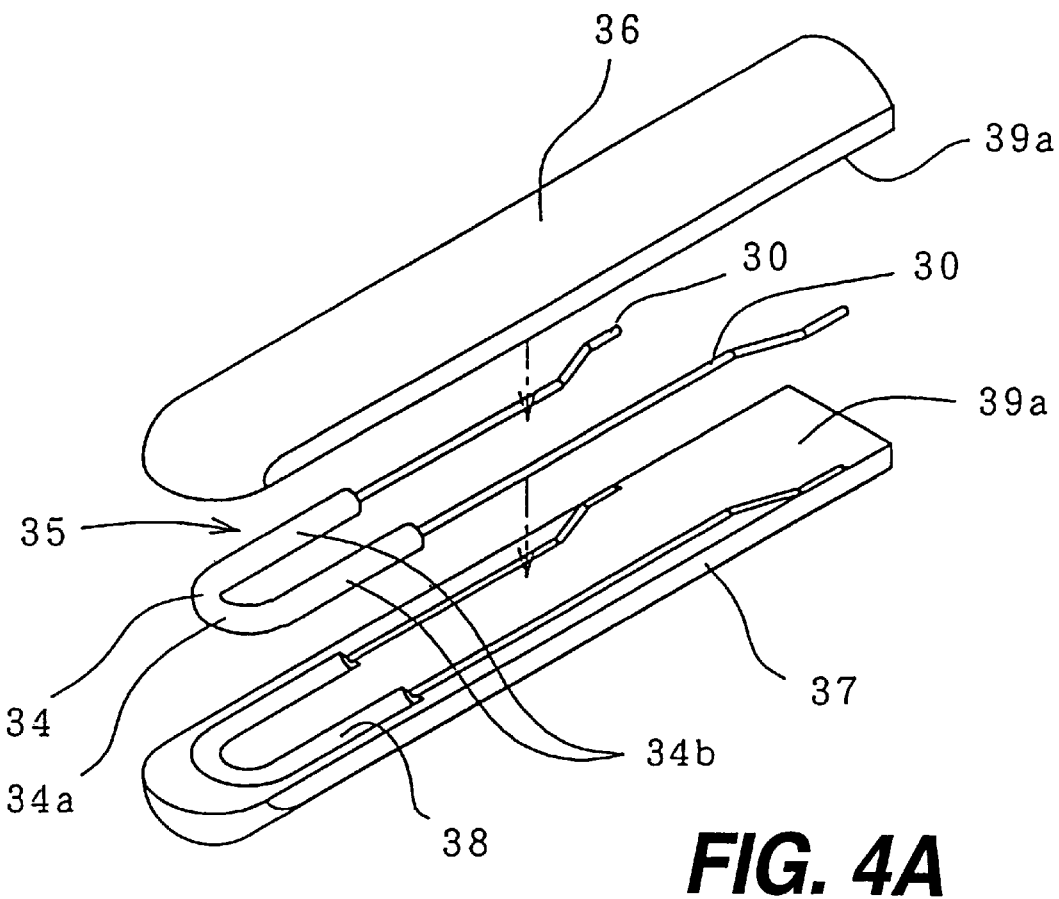
FIGS. 4A and 4B are views for explaining the process continued from FIGS. 3A and 3B.

On the other hand, beside above, separated preforms 36, 37 formed separately as upper and lower portions, respectively, as shown in FIG. 4A are prepared in advance through a process in which ceramic powder to form the ceramic body 13 is press-molded. Incidentally, as the ceramic powder, there is used powder obtained through a process in which adjustment ceramic component powder in a range of from 1 to 3% by weight, sintering assistant agent powder in a range of from 3 to 15% by weight and a slight amount of binder for press-molding are added and mixed into $Si_3N_4$ powder which is a main component.

Figure 5A:
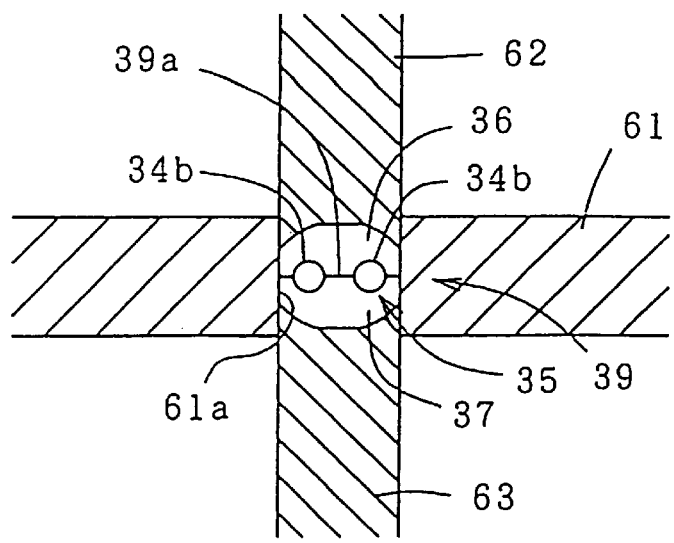
FIGS. 5A and 5B are views for explaining the process continued from FIGS. 4A and 4B.
Figure 5B:
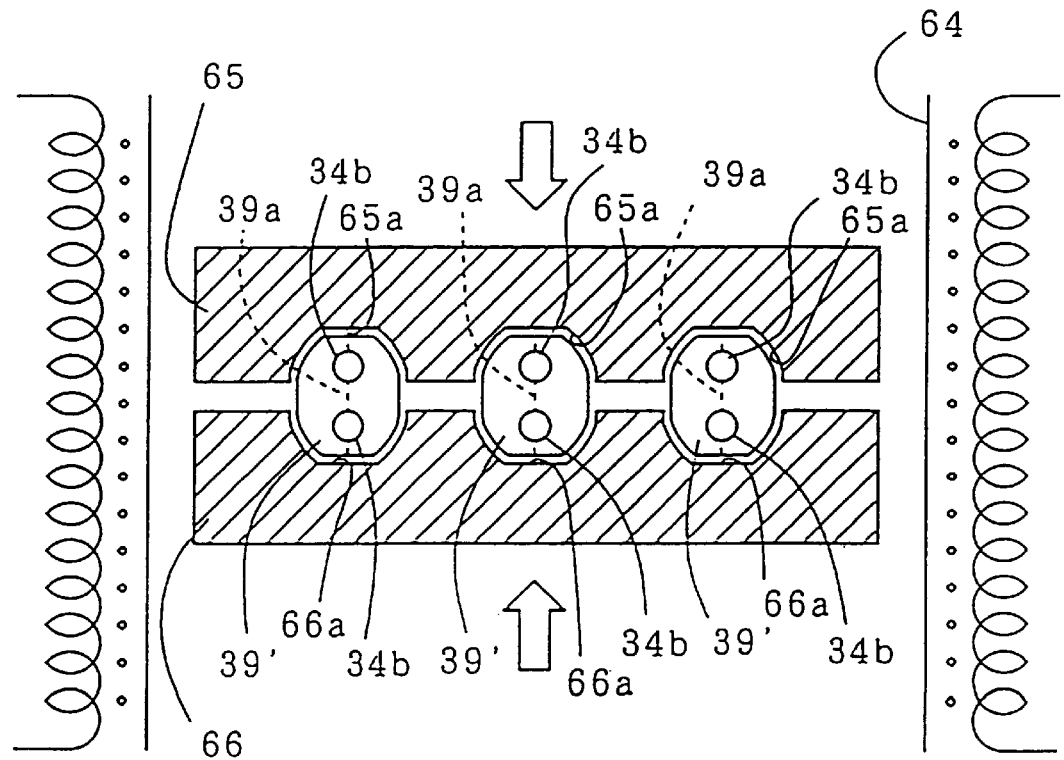

Each of these separated preforms 36, 37 has a concave portion 38 formed in a mold-register face 39*a* having a shape correspondingly to the aforementioned integral molding 35. Then, the integral molding 35 is received in the concave portion 38 and the separated preforms 36, 37 are mold-registered in the mold-register faces 39*a*. Then, as shown in FIG. 5A, the separated preforms 36, 37 and the integral molding 35 in this condition are received in a cavity 61*a* of a mold 61 and pressed/compressed by using punches 62 and 63 to thereby form a composite molding 39 in which the integral molding 35 and the separated preforms are integrated with each other as shown in FIGS. 5B and 6A. Here, the pressing direction is selected to be substantially perpendicular to the mold-register faces 39*a* of the separated preforms 36, 37.

Figure 4B:
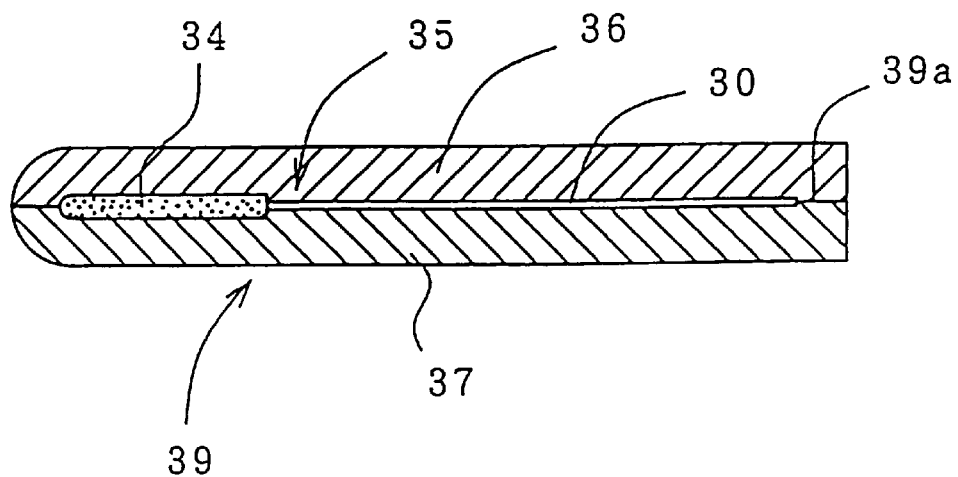

In order to remove the binder component or the like, thus obtained composite molding 39 is first calcined at a predetermined temperature (for example, about 800° C.) to thereby form a calcined matter 39' as shown in FIG. 6B. Then, as shown in FIG. 5B, the calcined matter 39' is set in cavities 65*a*, 66*a* of hot-press molds 65, 66 formed from graphite, or the like. While being pressed between the two molds 65, 66 in a furnace 64, the calcined matter 39' is sintered at a predetermined temperature (for example, about 1800° C.) so as to form a sintered body 70 as shown in FIG. 6C. At this time, the electrically conductive ceramic powder molding portion 34 and the separated preforms 36, 37 as shown in FIG. 4B are designed to form the heating element 10 and the ceramic body 13, respectively. Further, the electrode materials 30 form the electrode portions 11, 12, respectively.

Here, while the calcined matter 39' is compressed along the mold-register faces 39*a* of the separated preforms 36, 37, a sintered body 70 is formed as shown in FIG. 6B. Then, as shown in FIG. 6C, the circular section in each of the linear portions 34*b* of the electrically conductive ceramic powder molding portion 34 is deformed so as to be pressed in the aforementioned compressing direction to thereby form linear portions 10*b* of the heating element 10 having an ellipsoid section. Then, as shown in FIG. 6D, the outer circumferential surface of the sintered body 70 is processed by polishing or the like, so as to shape the section of the ceramic body 13 circularly to thereby form a final ceramic heater 1.

Incidentally, as shown in FIG. 7, the shaped of the heating element may be pattern-printed on a molding of ceramic powder body by using paste of the electrically conductive ceramic powder and may be sintered the printed heating element pattern to thereby form a heating element 10.

Figure 8A:
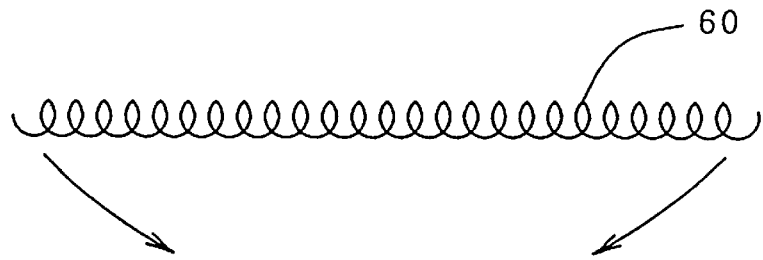
FIGS. 8A to 8C are an explanatory views showing an example of configuration in which the heating element is formed from a metal wire and the method of producing the same.
Figure 8B:
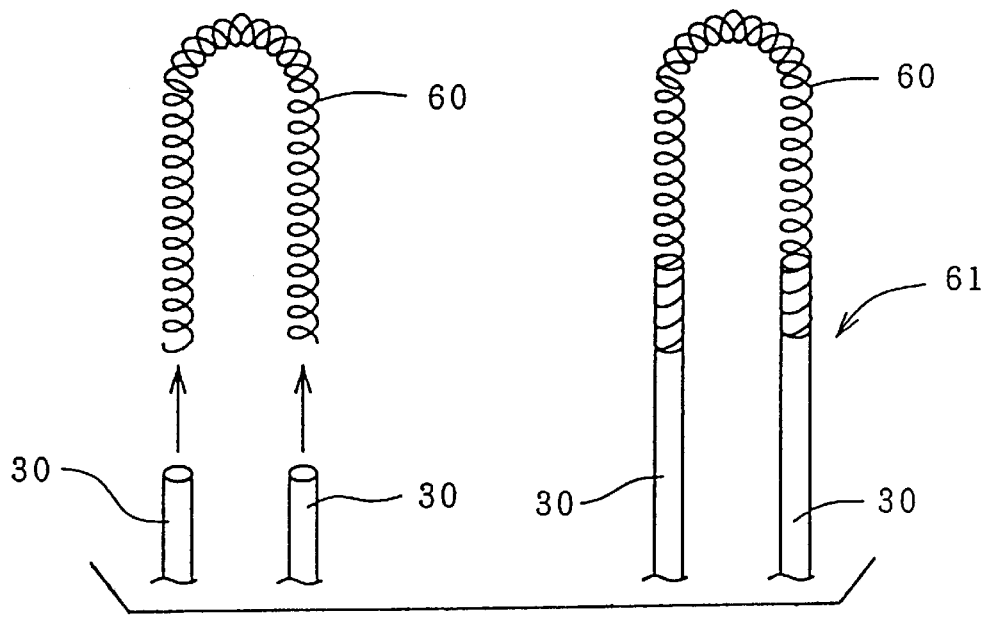
Figure 8C:
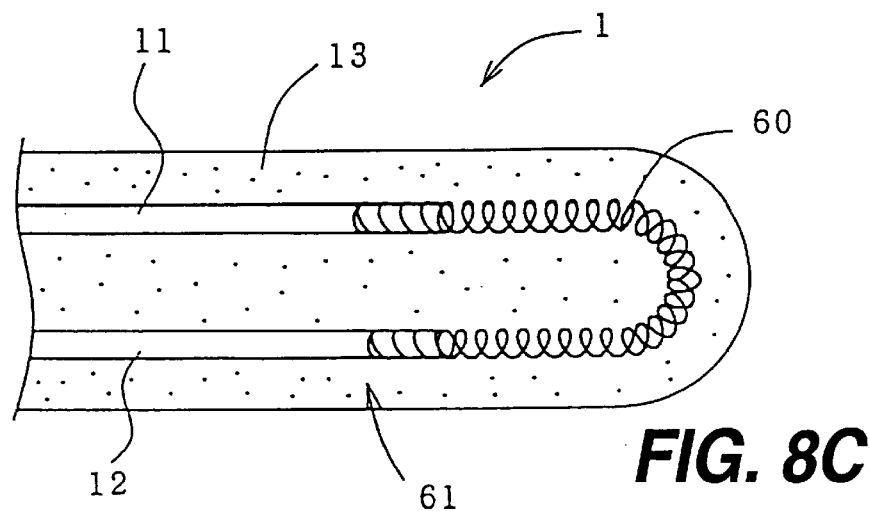

Further, in the ceramic heater 1, the heating element 10 may be formed from a metal wire of W, W—Re, Mo, Pt, niobium, nichrome, tantalum, etc. A specific example and the method of producing the same are shown in FIGS. 8A to 8C. Because this example is common to the case where the heating element is formed from ceramics in most part of configuration and producing method, mainly the point of difference between the both will be described below, and the description about the common portion will be omitted.

That is, the aforementioned high-melting-point metal material wire material 60 shaped like a coil as shown in FIG. 8A is bent in the form of U as shown in FIG. 8B and electrode materials 30 are inserted into the inside of the both ends of the wire material 60 so as to be integrated with the wire material 60 to thereby form a heating element unit 61. Then, in FIG. 4, the heating element unit 61, instead of the integral injection molding 35, is attached into concave portions 38 of the separated preforms 36, 37 and they are united into one body by pressing to thereby form a composite molding. When the composite molding is sintered by hot-pressing, there is obtained a ceramic heater 1 in which the wire material 60 as a heating element is embedded in the ceramic body 13 as shown in FIG. 8C.

Further, the ceramic heater according to the present invention can be applied not only to the glow plug but also to a heating element for burner ignitor or oxygen sensor, or the like.

EXAMPLES

Various ceramic heaters each having the shape shown in FIG. 2 were produced by the aforementioned method with the use of $MoSi_2$ as the adjustment ceramic component and $Y_2O_3$ as the sintering assistant agent. Incidentally, the amount of $MoSi_2$ to be added was adjusted to be in a range of from 1 to 10% by weight (in a range of from 1 to 3% by weight in Examples, and from 3.5 to 10% by weight in Comparative Examples). Further, hot-press sintering was performed at 1750° C. and 300 kgf/cm² for 30 minutes. The ceramic heaters thus obtained were subjected to a current-conduction durability test and a cooling-heating cycle test. The experimental method for the current-conduction durability test was carried out as follows. That is, one cycle is defined so that a predetermined voltage was applied to each of the ceramic heaters to make a current flow in the ceramic heaters, the current-conduction state was kept for 5 minutes after the temperature was equilibrated to 1400° C., thereafter the current conduction was then stopped, and the state was kept for 1 minute. This step was repeated by 10,000 cycles for every ceramic heater. If the heating temperature lowers not smaller than 150° C. in comparison with the first cycle, it is judged to be bad, and the other case where such lowering was not observed was judged to be good. On the other hand, the cooling-heating cycle test was carried out by putting the ceramic heater in an electric furnace and repeating a cycle of heating and cooling the ceramic heater between 400° C. and 900° C. by 5000 times under program control. After the test, the ceramic body portion was cut and polished and its surface was observed by an optical microscope. Results are shown in Table 2.

TABLE 2

| | COMPOSITION | | | Current-Conduction | Cooling-Heating Cycle |
|---|---|---|---|---|---|
| | $Si_3N_4$ | $Y_2O_3$ | $MoSi_2$ | Durability Test | Test |
| Example 1 | 87.3 | 9.7 | 3.0 | 10000 cycles OK | No pore; Good |
| Example 2 | 87.39 | 9.71 | 2.9 | 10000 cycles OK | No pore; Good |
| Example 3 | 87.75 | 9.75 | 2.5 | 10000 cycles OK | No pore; Good |
| Example 4 | 88.2 | 9.8 | 2 | 10000 cycles OK | No pore; Good |
| Example 5 | 89.1 | 9.9 | 1 | 10000 cycles OK | No pore; Good |
| Comp. Ex. 1 | 81 | 9 | 10 | 10000 cycles OK | Lots of Pores & Cracks are generated |
| Comp. Ex. 2 | 82.8 | 9.2 | 8 | 10000 cycles OK | Lots of Pores & Cracks are generated |
| Comp. Ex. 3 | 85.5 | 9.5 | 5 | 10000 cycles OK | Lots of Pores are generated |
| Comp. Ex. 4 | 85.4 | 9.6 | 4 | 10000 cycles OK | Pores are genera ted |
| Comp. Ex. 5 | 86.85 | 9.65 | 3.5 | 10000 cycles OK | Pores are generated |

Although both ceramic heaters in Examples and Comparative Example were good in the current-conduction durability, a considerable number of pores considered to be caused by the formation and sublimation of oxide were formed in the ceramic heater of Comparative Examples in the cooling-heating cycle test. Particularly, in the heaters of Comparative Examples 1 and 2 in which the amount of $MoSi_2$ to be mixed was large, occurrence of cracking was observed. On the contrary, in the ceramic heaters of Examples, occurrence of any pores and cracking was not observed.

What is claimed is:

1. A ceramic heater comprising:

a ceramic body consisting essentially of a sintered basic ceramic component and an adjustment ceramic component, said adjustment ceramic component being present in an amount from 1 to 3% by weight, said adjustment ceramic component comprising at least one component selected from the group consisting of metal silicate, metal carbonate, metal boride, and metal nitride each of which is larger in thermal expansion coefficient than said basic ceramic component; and a heating element being embedded in said ceramic body wherein said heating element comprises a ceramic electrically conductive material.

2. A ceramic heater according to claim 1, wherein said ceramic electrically conductive material has a structure in which an electrically conductive ceramic phase is dispersed in a matrix ceramic phase.

3. A ceramic heater according to claim 2, wherein said electrically conductive ceramic phase comprises at least one selected from the group consisting of silicide of W, Ta, Nb, Ti, Mo, Zr, Hf, V and Cr; carbide of W, Ta, Nb, Ti, Mo, Zr, Hf, V and Cr; boride of W, Ta, Nb, Ti, Mo, Zr, Hf, V and Cr; and nitride of W, Ta, Nb, Ti, Mo, Zr, Hf, V and Cr.

4. A ceramic heater according to claim 3, wherein said electrically conductive ceramic phase comprises at least one selected from the group consisting of WC, $Mo_5Si_3$ and $MoSi_2$.

5. A ceramic heater according to claim 2, wherein a content of said electrically conductive ceramic phase in said heating element is in the range of 30% to 80% by weight.

6. A ceramic heater according to claim 1, wherein said basic ceramic component of said ceramic body comprises one selected from the group consisting of $Si_3N_4$ and AlN.

7. A ceramic heater according to claim 1, wherein said adjustment ceramic component comprises at least one component selected from the group consisting of silicates, carbonates, borides and nitrides of W, Ta, Nb, Ti, Mo, Zr, Hf, V, and Cr.

8. A ceramic heater according to claim 1, wherein said sintered basic ceramic component containing an adjustment ceramic component in the range of 2 to 3% by weight.

9. A ceramic heater according to claim 1, wherein said sintered basic ceramic component contains a sintering assistant agent component and inevitable impurities.

10. A ceramic heater according to claim 9, wherein said sintering assistant agent component is one selected from the group consisting of rare-earth oxide and alkali-earth metal.

11. A ceramic heater according to claim 9, wherein a content of said sintering assistant agent component in said basic ceramic component is in the range of 3 to 15% by weight.

* * * * *